United States Patent [19]

Norton et al.

[11] 3,836,114

[45] Sept. 17, 1974

[54] COUPLING ASSEMBLY

[75] Inventors: James F. Norton, Berea; William F. Creadon, Cleveland, both of Ohio

[73] Assignee: The Hansen Manufacturing Company, Cleveland, Ohio

[22] Filed: Aug. 27, 1973

[21] Appl. No.: 391,676

[52] U.S. Cl. ............................. 251/149.6, 285/316
[51] Int. Cl. ..................... F16l 29/00, F16l 37/28
[58] Field of Search ..................... 251/149.1, 149.6; 137/614.04; 285/277, 316

[56] References Cited
UNITED STATES PATENTS

| | | | |
|---|---|---|---|
| 2,279,146 | 4/1942 | Schneller | 285/349 X |
| 2,419,503 | 4/1947 | Scheiwer | 251/149.6 X |
| 2,850,297 | 9/1958 | Clark | 251/149.6 |
| 3,131,905 | 5/1964 | Nyberg | 251/149.6 |
| 3,457,954 | 7/1969 | Nyberg | 251/149.6 X |
| 3,464,436 | 9/1969 | Bruning | 251/149.1 X |
| 3,650,507 | 3/1972 | Nyberg | 251/149.6 |

*Primary Examiner*—William R. Cline

[57] ABSTRACT

An improved coupling includes a socket assembly having a retainer which holds locking elements or balls in a disengaged condition when the coupling is disconnected and releases the locking elements for movement into engagement with a plug as it is inserted into the socket assembly. When the plug is inserted into the socket assembly, the leading end portion of the plug moves a valve member out of engagement with a seal disposed in an axially extending valve chamber. The leading end of the plug is then engaged by the seal to block fluid leakage around the plug. During continued inward movement of the plug, the retainer and seal move axially inward together. As the retainer moves axially inward, narrow inner portions of slots formed in the retainer move away from the locking balls and wide outer portions of the slots move adjacent to the locking balls. An outer sleeve on the socket assembly can then press the balls inwardly through the wide outer portions of the slots into engagement with the plug to hold it in place.

16 Claims, 7 Drawing Figures

COUPLING ASSEMBLY

BACKGROUND OF THE INVENTION

This invention relates generally to a coupling and more specifically to a coupling which includes a socket assembly having an improved retainer which holds locking elements in a disengaged condition when the coupling is disconnected and releases the locking elements for movement to an engaged condition when the coupling is connected.

Known couplings are disclosed in U. S. Pat. No. 2,279,146 and U.S. Pat. application Ser. No. 355,183 filed Apr. 27, 1973, by James F. Norton and entitled "Socket Assembly". Each of these known couplings includes a socket assembly having an axially movable ball retainer. When one of the couplings is disconnected, the retainer holds the locking balls outward in a disengage condition. As a plug is inserted condition. As a plug is inserted into the socket assembly, the retainer is moved away from the locking balls. As this occurs, an outer sleeve cams or forces the balls inwardly into engagement with the plug.

SUMMARY OF THE INVENTION

The present invention relates to a coupling having a new and improved socket assembly. The socket assembly includes a body defining an axially extending chamber which is adapted to receive a plug upon operation of the coupling from a disconnected condition to a connected condition. A plurality of locking elements or balls are movable relative to the socket body from a disengaged condition to an engaged condition in which they are effective to hold a plug in the chamber. An improved retainer is provided to hold the locking balls in the disengaged condition when the coupling is disconnected and to release the locking balls for movement to the engaged condition upon operation of the coupling to the connected condition.

The improved retainer includes a sleeve or skirt having a plurality of longitudinally extending slots each of which is associated with one of the locking balls. An inner portion of each of the slots is relatively narrow and holds the associated locking ball in the disengaged condition. When a plug is inserted into the socket assembly, the plug moves the retainer axially inwardly. As the retainer moves inwardly, relatively wide outer portions of the slots are moved adjacent to the locking balls. The locking balls can then move through the wide outer portions of the slots into gripping engagement with the plug to hold the plug in the chamber.

The coupling assembly is provided with an axially movable seal which sealingly engages the plug as it is inserted in the chamber. The retainer is effective to move the seal axially inwardly with the plug as the plug is inserted into the chamber. In addition, a valve member is provided in the chamber. When the coupling is disconnected, the valve member is closed against the seal to block fluid flow through the socket assembly. Axially outward movement of the closed valve member and seal is limited by engagement of the inner portions of the slots with the locking balls.

Upon initial movement of the plug into the chamber, the valve member is moved away from the seal by the plug to enable fluid to flow under pressure through the socket assembly. As the plug continues to move into the chamber, the plug moves the open valve member, seal, and retainer axially relative to the socket body. The valve member is advantageously shaped to define passages which enable fluid to flow through the socket assembly without passing between adjacent coils of a spring which biases the valve member toward a closed condition and urges the seal and retainer axially outwardly.

Accordingly, it is an object of this invention to provide a new and improved coupling which includes a socket assembly having an axially movable retainer which is effective to hold locking elements in a disengaged condition and is effective to release the locking elements for movement to an engaged condition as a plug is inserted into the socket assembly.

Another object of this invention is to provide a new and improved coupling in accordance with the next preceding object and wherein the retainer includes a plurality of longitudinally extending slots, each of which is associated with one of the locking elements and has a narrow inner portion to hold the locking elements in a disengaged condition and a relatively wide outer portion to enable the locking elements to engage the plug as it is inserted into the socket assembly.

Another object of this invention is to provide a new and improved socket assembly having an axially movable valve member, seal, and retainer and wherein the retainer includes slots through which locking elements can extend into engagement with a plug as it is inserted into the socket asssembly.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE PREFERRED EMBODIMENT OF THE INVENTION

Figure 1:
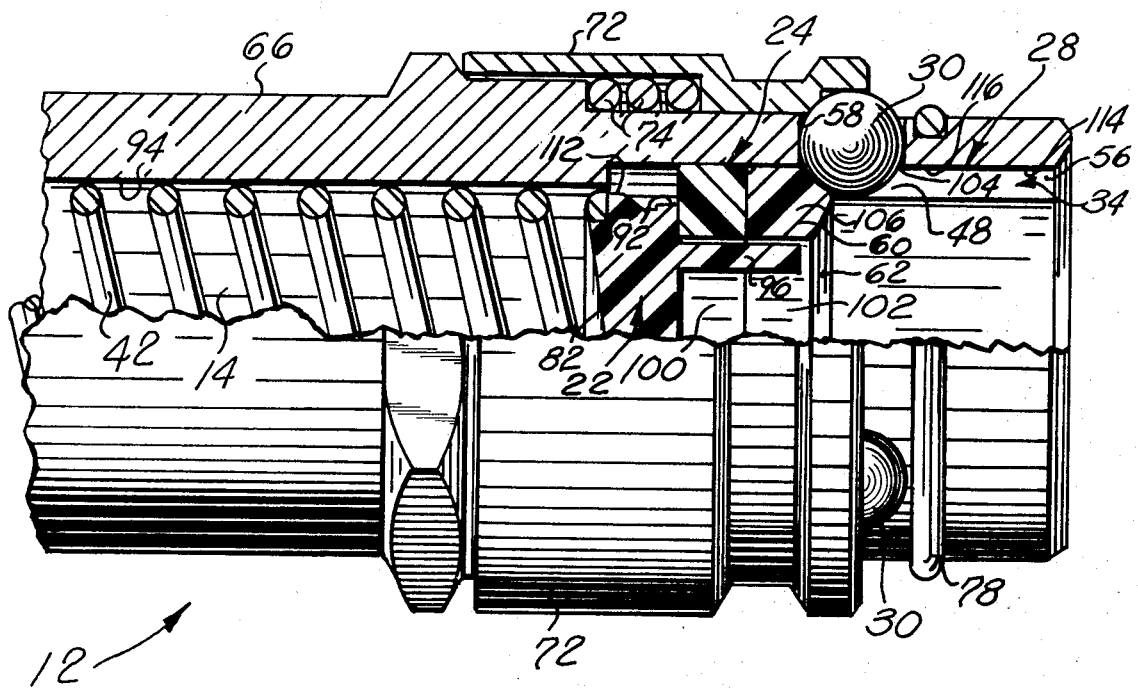
FIG. 1 is an enlarged and partially broken away view of a socket assembly constructed in accordance with the present invention.

A coupling 10 (FIG. 2) includes an improved socket assembly 12 (FIGS. 1 and 2) having an axially extending chamber 14 which receives a plug 16 when the coupling is connected. As the plug 16 is inserted into the chamber 14 to connect the coupling 10, a leading end 20 (FIG. 2) of the plug 16 moves the valve member 22 away from a seal 24. As the plug 16 continues to move inwardly, it is engaged by the seal 24 to block fluid flow around the plug. Still further inward movement of the plug 16 moves the seal 24 and a retainer 28 axially inwardly. This inward movement of the retainer 28 releases locking elements or balls 30 to engage the plug 16 and hold it against axial movement relative to the socket assembly 12.

Figure 3:
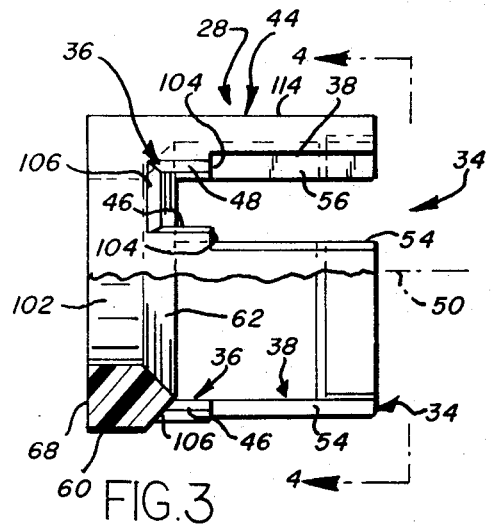
FIG. 3 is an enlarged an partially broken away sectional view illustrating the construction of the retainer of FIG. 2.
Figure 4:
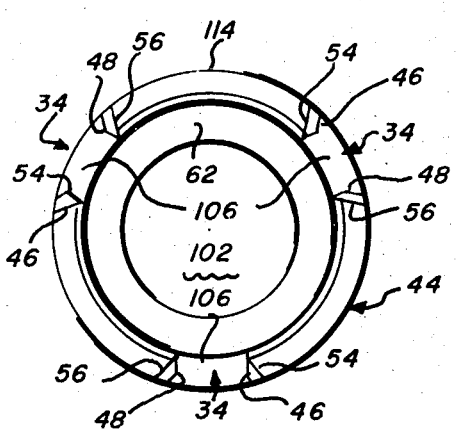
FIG. 4 is an elevational view, taken generally along the line 4—4 of FIG. 3, further illustrating the construction of the retainer.

In accordance with a feature of the present invention, the retainer 28 has a plurality of identical longitudinally extending slots 34 (FIGS. 3 and 4) having relatively narrow inner end portions 36 (FIG. 3) to hold the locking balls 30 in the disengaged condition of FIG. 1 when the coupling 10 is disconnected. The slots 34 have relatively wide outer portions 38 to release the locking balls 30 for radially inward movement as the plug 16 is inserted into the chamber 14 and the retainer 28 is moved axially inwardly.

The retainer 28 is integrally formed of plastic and includes a generally cylindrical skirt or sleeve portion 44 in which the straight, parallel slots 34 are formed. The inner portion 36 of a slot 34 is formed between a pair of inwardly facing side surfaces 46 and 48 which extend parallel to a longitudinal central axis 50 of the cylindrical skirt 44. The surfaces 46 and 48 have a relatively short longitudinal extent. Therefore, as soon as the retainer 34 has moved axially inwardly through a short distance, side surfaces 54 and 56 of the relatively wide outer portion 38 of the slot 34 move adjacent to an associated one of the locking balls 30. The relatively wide spacing between the side surfaces 54 and 56 enables the associated locking ball 30 to move radially inwardly into engagement with a groove in the plug 16 (see FIG. 2). It should be noted that the distance between the sloping side walls 54 and 56 of the relatively wide portion 38 of each of the identical slots 34 is less than the diameter of the associated one of the locking balls 30 as that the retainer 28 is effective to limit radially inward movement of the locking balls. This prevents the locking balls moving radially inwardly out of cylindrical holes 58 in the socket body 66 (FIG. 2) if the retainer is moved axially inwardly with the coupling disconnected.

The retainer 28 has an annular head 60 which is integrally formed with the skirt 44 and has an annular, radially inwardly beveled actuator surface 62 which engages a shoulder 64 (FIG. 2) on the plug 16 as it is inserted into the chamber 14. The interaction between the shoulder 64 on the plug 16 and surface 62 on the retainer 28 causes the retainer to move axially inwardly with the plug 16. Of course, the inward movement of the retainer 28 moves the wide outer portions 38 of the slots 34 adjacent to the locking balls 30 to release the locking balls for radially inward movement.

When the coupling 10 is to be connected, the plug 16 is inserted into the chamber 14 and moves the valve member 22 to the open position. Thereafter, the shoulder 64 of the plug 16 presses against the actuator surface 62 and the retainer member 28 is moved inwardly with the plug. This causes the annular seal 24 (see FIG. 1) to move axially inwardly along with the now open valve member 22. The seal 24 is moved inwardly under the influence of pressure forces applied against an axially outer surface of the seal by an annular end face 68 (FIG. 3) of the retainer 28.

When the retainer 28, seal 24, and valve member 22 are moved inwardly through a sufficient distance to enable the locking balls 30 to engage the relatively wide outer portions 38 of the slots 34, the locking balls 30 are cammed or forced radially inwardly by an outer sleeve 72 (FIG. 1) which is slidably mounted on the socket body 66. The sleeve 72 is urged axially outwardly under the influence of a biasing spring 74. Therefore, when the relatively wide outer portions 38 of the slots 34 have moved adjacent to the locking balls 30, the force applied by the spring 74 aginst the sleeve 72 causes the sleeve 72 to move axially outwardly from the position shown in FIG. 1 to the position shown in FIG. 2. As this occurs the locking balls 30 are pressed radially inwardly through the rectangular openings formed between the side surfaces 54 and 56 of the outer portions 38 of the slots 34. As the balls 30 move inwardly, they engage a groove formed in the plug to hold the plug against axial movement in a known manner. Outward movement of the sleeve 72 under the influence of the biasing spring 74 is limited by a lock ring 78 which circumscribes an outer end portion of the valve body 66.

Figure 5:
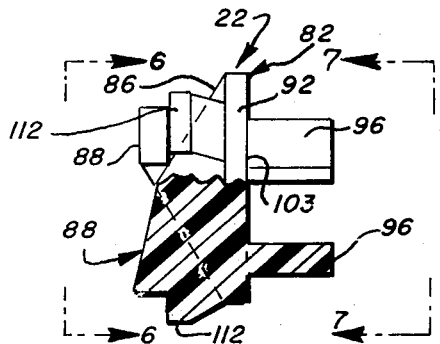
FIG. 5 is a partially broken away fragmentary illustration, taken on an enlarged scale, of the valve member of FIG. 2.
Figure 6:
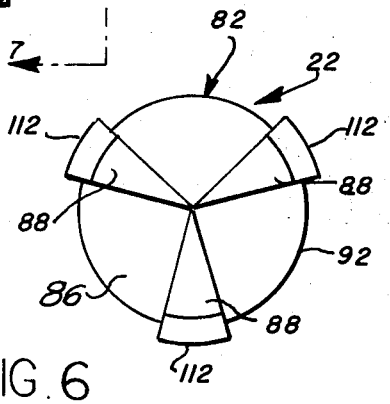
FIG. 6 is an elevational view, taken generally along the line 6—6 of FIG. 5, illustrating the construction of a head or upstream end portion of the valve member.

The valve member 22 has a head portion 82 (FIG. 5) which cooperates with the valve spring 42 to define a plurality of radially extending passages which enable fluid to flow through the socket assembly 12 without passing between adjacent turns or coils of the valve spring 42. Thus, the head portion 82 of the valve member 22 has a generally conical surface 86 on which there are formed a plurality of outwardly projecting spring positioning and retaining sections 88 (see FIG. 6). The projections 88 hold the outermost turn of the valve spring 42 away from the conical surface 86 so that fluid can flow radially outwardly between the outer turn of the valve spring 42 and the surface 86.

Figure 7:
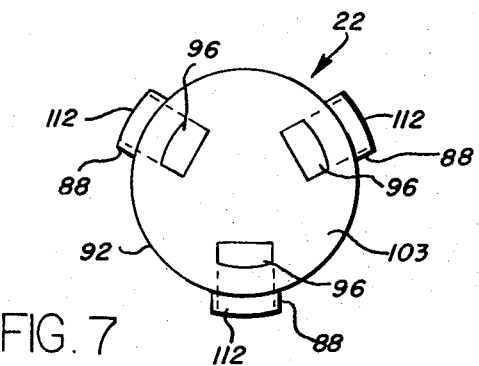
FIG. 7 is an elevational view, taken generally along the line 7—7 of FIG. 5, illustrating the construction of the downstream end portion of the valve member.

After having passed between the outer turn of the spring 42 and the surface 86, the fluid flows between an annular outer surface or rim 92 of the valve head 82 and a cylindrical inner surface 94 of the valve chamber 14 (see FIG. 1). Having passed between the circular outer rim 92 of the valve head 82 and the inner wall 94 of the valve chamber 14, the fluid then flows radially inwardly between axially outwardly projecting legs 96 (FIGS. 5 and 7) of the valve member 22. The fluid then flows through circular central openings 100 and 102 (FIGS. 1 and 4) defined by the seal member 24 and retainer 28. Thus, when the valve member 22 is in the open position of FIG. 2, fluid can flow through the coupling 10 without passing through the adjacent turns of the valve spring 42.

Figure 2:
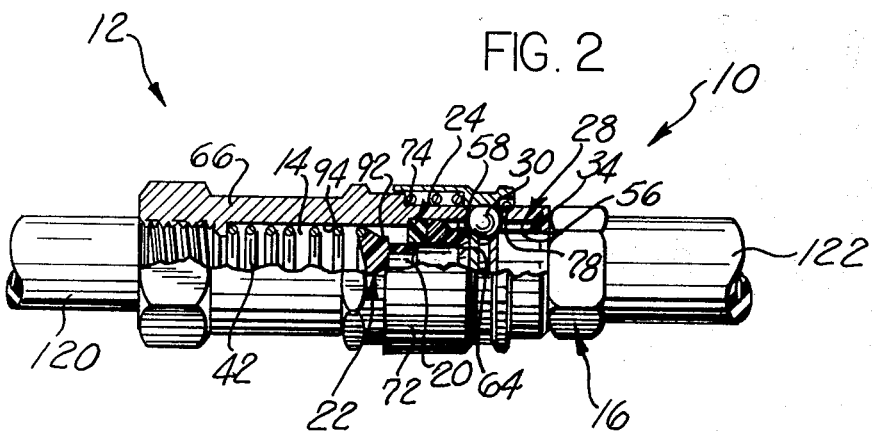
FIG. 2 is a partial sectional view of a coupling which includes the socket assembly of FIG. 1, the coupling being illustrated in FIG. 2 in a connected condition in which a valve member in the socket assembly is opened and a retainer has been moved axially inwardly to release locking elements or balls to grip the plug.

When the coupling 10 is to be operated from the connected condition of FIG. 2 to the disconnected condition, the sleeve 72 is moved axially inwardly, that is to the position shown in FIG. 1, to release the locking balls 30. As the plug 16 is withdrawn from the valve chamber 14, the valve member 22 moves outwardly until a radially extending circular surface 103 (FIGS. 5 and 7) on the head 82 of the valve member moves into sealing engagement with an axially inner surface of the annular seal 24 (FIG. 1). As the plug 16 is further withdrawn from the valve chamber 14, the valve spring 24 moves the now closed valve member 22, seal 24, and retainer 28 axially outwardly together.

As the retainer 28 moves axially outwardly, the locking balls 30 are cammed radially outwardly to the disengaged position of FIG. 1 by engagement with shoulders 104 which separate the relatively wide outer portions 38 of the slots 34 from the relatively narrow inner portions 36. Still further outward movement of the plug 16 and retainer 28 results in engagement of end surfaces 106 of the slots 34 with the balls 30. This blocks further outward movement of the retainer 28 and holds the locking balls 30 firmly against the axially outer end portion of the sleeve 72 (see FIG. 1).

It should be noted that fluid pressure forces applied against the closed valve member 22 are counteracted by forces applied by the locking balls 30 against the end surfaces 106 of the slots 34. Thus, engagement of the locking balls 30 with the end surfaces 106 prevents the retainer 28, seal 24 and closed valve member 22 from being forced axially outwardly from the chamber 14 under the combined influence of the spring 42 and fluid pressure forces on the closed valve member 22. In addition, the annular head 60 of the retainer 28 provides a solid base for the seal 24 to enable the circular surface 103 (FIGS. 5 and 7) on the closed valve member 22 to be pressed firmly against the annular seal 24.

To prevent binding or cocking of the valve member 22 in the chamber 14 as the valve member is moved between the closed position of FIG. 1 and the open position of FIG. 2, the projections 88 on the head of the valve member extend radially outwardly of the annular side surface 92 into engagement with the wall of the chamber 14. Thus, arcuate guide surfaces 112 (see FIG. 6) on the projections 88 slidably engage the cylindrical inner surface 94 of the valve chamber 14. The guide surfaces 112 are disposed in a common circle having a diameter of the cylindrical surface 94. Similarly, movement of the retainer 28 is guided by engagement of a cylindrical outer surface 114 of the retainer with a cylindrical surface 116 of the chamber 14.

In view of the foregoing description, it can be seen that the coupling 12 is operable between a disconnected condition and a connected condition in which a conduit 120 connected with the socket assembly 12 is connected in fluid communication with a conduit 122 connected with the plug 16. The socket assembly 12 includes a socket body 66 which defines an axially extending chamber 14 which receives the plug 16 when the coupling 10 is in the connected condition of FIG. 2. The locking balls 30 are disposed in an annular array about the socket body 66.

When the plug 16 is inserted into the chamber 14, the leading end 20 of the plug engages the outer ends of the legs 96 on the valve member 22 to move it to the open position. Continued inward movement of the plug 16 brings it into engagement with the actuator surface 62 on the retainer 28. The retainer 28 is moved axially inwardly to release the locking balls 30 for movement from the disengaged condition of FIG. 1 to the engaged condition of FIG. 2 under the influence of outward movement of the sleeve 72.

The retainer 28 includes a plurality of slots 34 which extend parallel to the central axis 50 of a sleeve portion 44 of the retainer. The slots 34 have relatively narrow inner portions 36 which are effective to hold the locking balls 30 in the disengaged position. Upon axially inward movement of the retainer 28 under the influence of the plug 16, the relatively wide outer portions 38 of the slots move adjacent to the locking balls 32 to release them for radially inward movement to the engaged position of FIG. 2.

When the coupling 10 is to be disconnected, the sleeve 72 is moved axially inwardly, that is toward the left as viewed in FIG. 2. This releases the balls 30 for radially outward movement from the engaged position of FIG. 2 to the disengaged position of FIG. 1. As the plug 16 is withdrawn from the socket assembly 12, the retainer sleeve 28 is moved axially outwardly to cam the locking balls to the disengaged position of FIG. 1. During this outward movement of the plug 16, the valve spring 42 is effective to move the valve member 22 to the closed position and to press the seal 24 and retainer 28 outwardly. Axially outward movement of the retainer 28, seal 24 and valve member 22 under the influence of the spring 42 and fluid pressure applied against the valve member is limited by abutting engagement of the end surfaces 106 of the retainer slots 34 with the locking balls 30.

Although the socket assembly has been shown as having an internal valve member 22, it is contemplated that under certain circumstances valve member 22 may be eliminated. The spring 42 would then press the seal 24 against the axially inner end surface 68 of the retainer 28 to thereby urge the retainer 28 to the axially outward position of FIG. 1. It is also contemplated that under certain circumstances it may be desirable to provide the seal member 24 with a relatively long axial extent so that the seal 24 sealingly engages the leading end of the plug before the valve member 22 is opened by engagement with the leading end of the plug with the legs 96 on the valve member. It is further contemplated that under certain circumstances the construction of the slots 34 may be changed to provide the narrow inner portions 36 with an inner or bottom surface. It is also contemplated that under certain circumstances locking elements other than the balls 30 could be utilized.

Having disclosed one specific preferred embodiment of the invention, the following is claimed:

1. A coupling assembly operable between a disconnected condition and a connected condition to connect a pair of conduits in fluid communication, said coupling assembly comprising a plug adapted to be connected with one of the conduits, socket means adapted to be connected with the other conduit, said socket means including a socket body defining an axially extending chamber adapted to receive said plug upon operation of said coupling assembly from the disconnected condition to the connected condition, a plurality of locking elements operatively connected with said socket body and movable relative to said socket body between a disengaged condition in which said locking elements are ineffective to hold said plug in said chamber and an engaged condition in which said locking elements extend into said chamber to hold said plug in said chamber when said coupling assembly is in the connected condition, and retainer means for holding said locking elements in the disengaged condition when said coupling assembly is in the disconnected condition and for releasing said locking elements for movement to the engaged condition upon operation of said coupling assembly to the connected condition, said retainer means including first surface means defining a plurality of longitudinally extending slots each of which is associated with one of said locking elements, each of said slots having an axially inner portion for holding the associated one of said locking elements in the disengaged condition when said coupling assembly is in the disconnected condition and an axially outer portion through which the associated one of said locking elements extends into engagement with said plug when said coupling assembly is in the connected condition, said retainer means further including second surface means for engaging said plug and effecting axial movement of said retainer means relative to said locking elements and socket body as said plug is received in said chamber to move said inner portions of said slots away from said locking elements and to move said outer portions of said slots adjacent to said locking elements to thereby release said locking elements for movement from said disengaged condition to said engaged condition upon operation of said coupling assembly from the disconnected condition to the connected condition.

2. A coupling assembly as set forth in claim 1 wherein said socket means further includes seal means disposed in said chamber axially inwardly of said retainer means for sealingly engaging said plug when said coupling is in the connected condition, said seal means being movable axially inwardly relative to said socket body by said retainer means upon operation of said coupling assembly from the disconnected condition to the connected condition.

3. A coupling assembly as set forth in claim 2 wherein said socket means further includes spring means for effecting outward movement of said retainer means and seal means upon operation of said coupling assembly from the connected condition to the disconnected condition.

4. A coupling assembly as set forth in claim 2 wherein said socket means further includes a valve member disposed in said chamber, said valve member being axially movable from a closed position disposed in sealing engagement with said seal means and blocking fluid flow through said socket means to an open condition enabling fluid to flow through said socket means.

5. A coupling assembly as set forth in claim 4 further including spring means for moving said valve member to the closed condition and for moving said seal means and retainer means axially outwardly upon operation of said coupling assembly from the connected condition to the disconnected condition.

6. A coupling assembly as set forth in claim 5 wherein said spring means includes a single spring member disposed in said chamber in abutting engagement with said valve member.

7. A coupling assembly as set forth in claim 1 wherein said inner portion of each of said slots includes first and second side surface areas which extend generally parallel to each other and are spaced apart by a first distance, said outer portion of each of said slots including third and fourth surface areas which extend generally parallel to each other and are spaced apart by a second distance which is greater than said first distance, said first and second surface areas being disposed adjacent to the associated one of said locking elements when the associated one of said locking elements is in the disengaged condition, said third and fourth surface areas being disposed adjacent to the associated one of said locking element when the associated one of said locking elements is in the engaged condition.

8. A coupling assembly as set forth in claim 1 wherein each of said slots includes shoulder means disposed between said inner and outer portions of each slot for urging the associated one of said locking elements radially outwardly during operation of said coupling assembly from the connected condition to the disconnected condition.

9. A coupling assembly as set forth in claim 1 wherein said retainer means further includes an axially extending sleeve portion in which said slots are defined by said first surface means, said sleeve portion having a generally cylindrical outer surface disposed in sliding engagement with a cylindrical inner surface of said chamber.

10. A coupling assembly as set forth in claim 1 further including spring means for urging said retainer means axially outwardly upon operation of said coupling assembly from the connected condition to the disconnected condition, said first surface means including means for defining an axially inner end portion of each of said slots, said axially inner end portions of each of said slots being engagable with the associated one of said locking elements to limit axially outward movement of said retainer means under the influence of said spring means upon operation of said coupling assembly from the connected condition to the disconnected condition.

11. A coupling assembly as set forth in claim 10 further including seal means disposed axially inwardly of said retainer means and axially outwardly of said spring means for sealingly engaging said plug when said coupling assembly is in the connected condition.

12. A coupling assembly as set forth in claim 1 wherein said socket means further includes valve means disposed in said chamber for blocking fluid flow through said socket means when said coupling assembly is in the disconnected condition, at least some of said inner end portions of said slots including surface means for engaging an associated one of said locking elements to limit axially outward movement of said valve means under the influence of fluid pressure when said coupling assembly is in the disconnected condition.

13. A coupling assembly operable between a disconnected condition and a connected condition to connect a pair of conduits in fluid communication, said coupling assembly comprising a plug adapted to be connected with one of the conduits, socket means adapted to be connected with the other conduit, said socket means including a socket body defining an axially extending valve chamber adapted to receive said plug upon operation of said coupling assembly from the disconnected condition to the connected condition, a valve member disposed in said valve chamber and movable between a closed condition and an open condition enabling fluid to flow through said valve chamber, seal means disposed in said valve chamber for sealingly engaging said valve member to block fluid flow through the valve chamber when said coupling assembly is in the disconnected condition and said valve member is in the closed condition, said seal means being movable axially relative to said socket body from a first position to a second position as said plug is received in the valve chamber, a plurality of locking elements operatively connected with said socket body and movable relative to said socket body between a disengaged condition in which said locking elements are ineffective to hold said plug in said valve chamber and an engaged condition in which said locking elements extend into said valve chamber to hold said plug in said valve chamber when said coupling assembly is in the connected condition, retainer means for holding said locking elements in the disengaged condition when said coupling assembly is in the disconnected condition and for releasing said locking elements for movement to the engaged condition upon operation of said coupling assembly to the connected condition, said retainer means including an axially movable sleeve portion disposed in said valve chamber and at least partially defining a plurality of longitudinally extending slots each of which is associated with one of said locking elements, each of said slots having an inner portion for holding the associated one of said locking elements in the disengaged condition when said coupling assembly is in the disconnected condition and an outer portion through which the associated one of said locking elements extends into engagement with said plug when said coupling assembly is in the connected condition, said retainer means further including surface means connected with said sleeve portion for engaging said plug and effecting axial movement of said valve member, seal means and sleeve portion relative to said socket body as said plug is received in said valve chamber to move said valve member to said open condition, said seal means to said second position and said outer portions of said slots adjacent to said locking elements, and means for guiding movement of said valve member, seal means and sleeve portion relative to said socket body as said plug is received in said valve chamber.

14. A coupling assembly as set forth in claim 13 wherein said socket means further includes spring means disposed in said valve chamber for urging said valve member toward said closed condition, for urging said seal means toward said first position, and for urging said sleeve portion outwardly toward the position in which said inner portions of said slots are adjacent to said locking elements.

15. A coupling assembly as set forth in claim 14 wherein said spring means comprises a coil spring disposed in abutting engagement with said valve member, said valve member including means for enabling fluid to flow along a path which is disposed inwardly of the coils of said coil spring.

16. A coupling assembly as set forth in claim 13 wherein said inner portions of at least some of said slots includes surface means for engaging an associated one of said locking elements to limit axially outward movement of said valve member, seal means and retainer means when said valve member is in the closed condition.

* * * * *